(12) United States Patent
Pinotti et al.

(10) Patent No.: US 10,027,258 B2
(45) Date of Patent: Jul. 17, 2018

(54) COMMERCIAL COMPRESSOR WITH ELECTRONIC START DEVICE FOR THE START OF THE ELECTRIC MOTOR

(71) Applicant: ILLINOIS TOOL WORKS INC., Glenview, IL (US)

(72) Inventors: Ermanno Pinotti, Via Pizzo Recastello (IT); Daniele Turetta, Via San Francesco (IT)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/564,512

(22) PCT Filed: Apr. 5, 2016

(86) PCT No.: PCT/US2016/026001
§ 371 (c)(1),
(2) Date: Oct. 5, 2017

(87) PCT Pub. No.: WO2016/182644
PCT Pub. Date: Nov. 17, 2016

(65) Prior Publication Data
US 2018/0076741 A1    Mar. 15, 2018

(30) Foreign Application Priority Data

May 12, 2015    (IT) .................. 102015000014801

(51) Int. Cl.
*H02P 1/44*       (2006.01)
*H02H 7/085*     (2006.01)
(Continued)

(52) U.S. Cl.
CPC ............ *H02P 1/445* (2013.01); *F25B 49/025* (2013.01); *F25D 17/06* (2013.01); *H02H 7/08* (2013.01); *H02H 7/0852* (2013.01)

(58) Field of Classification Search
CPC ............ H02P 1/42; H02P 25/04; F25D 21/06
(Continued)

(56) References Cited

U.S. PATENT DOCUMENTS 4,806,838 A * 2/1989 Weber .................. H02P 23/10
                                                                     318/729
5,296,795 A    3/1994 Dropps et al.
(Continued)

FOREIGN PATENT DOCUMENTS

CN    203984280 U    12/2014
EP       0647006 A1    4/1995

OTHER PUBLICATIONS

International Search Report for Application PCT/US2016/026001; dated Jul. 7, 2016.

*Primary Examiner* — Antony M Paul
(74) *Attorney, Agent, or Firm* — Boyle Fredrickson, S.C.

(57) ABSTRACT

A compressor for commercial refrigerators comprises an electric motor having a start winding (120) and a run winding (130), in which the input terminals of the start winding (120) and the run winding (130) are connected together and to the line voltage (L), and an electronic start device to supply the start winding (120) during a starting period. The electronic start device comprises a run condenser (40) having a first terminal connected to the output terminal from the start winding (120) and a second terminal connected to the output terminal from the run winding (130), and a start capacitor (45) having a first terminal connected to the output terminal of the start winding (120). In the electronic start device there is also provided a solid state switch (110) which supplies the start winding (120) and is connected between the second terminal of the start capacitor (45) and the neutral terminal of the supply (N), and a control circuit (100) comprising a delay circuit (210, 220) which controls switching of the solid state switch (110) closing it (Continued)

to start the motor and opening it at the end of the starting period once the motor has started.

12 Claims, 6 Drawing Sheets

(51) Int. Cl.
    *H02H 7/08*         (2006.01)
    *F25D 17/06*      (2006.01)
    *F25B 49/02*      (2006.01)

(58) Field of Classification Search
    USPC .......... 318/785, 786, 789, 748, 400.01, 700,
               318/701, 727, 799, 801, 794, 795, 796;
               361/23, 24, 25, 26, 27, 28, 29, 32, 34,
               361/734, 728, 729, 730, 731, 732, 807,
                   361/809, 811; 62/155, 156
    See application file for complete search history.

(56) References Cited

U.S. PATENT DOCUMENTS

| | | | | |
|---|---|---|---|---|
| 5,463,874 | A * | 11/1995 | Farr | F25B 49/02 |
| | | | | 361/22 |
| 5,528,120 | A * | 6/1996 | Brodetsky | H02P 1/445 |
| | | | | 318/778 |
| 6,982,539 | B1 | 1/2006 | Ward | |
| 7,679,307 | B2 * | 3/2010 | Mills, Jr. | F04B 49/02 |
| | | | | 318/748 |
| 9,160,259 | B2 * | 10/2015 | Souza | H02P 1/44 |
| 2006/0017417 | A1 * | 1/2006 | Botega, Jr. | H02P 1/42 |
| | | | | 318/786 |

\* cited by examiner

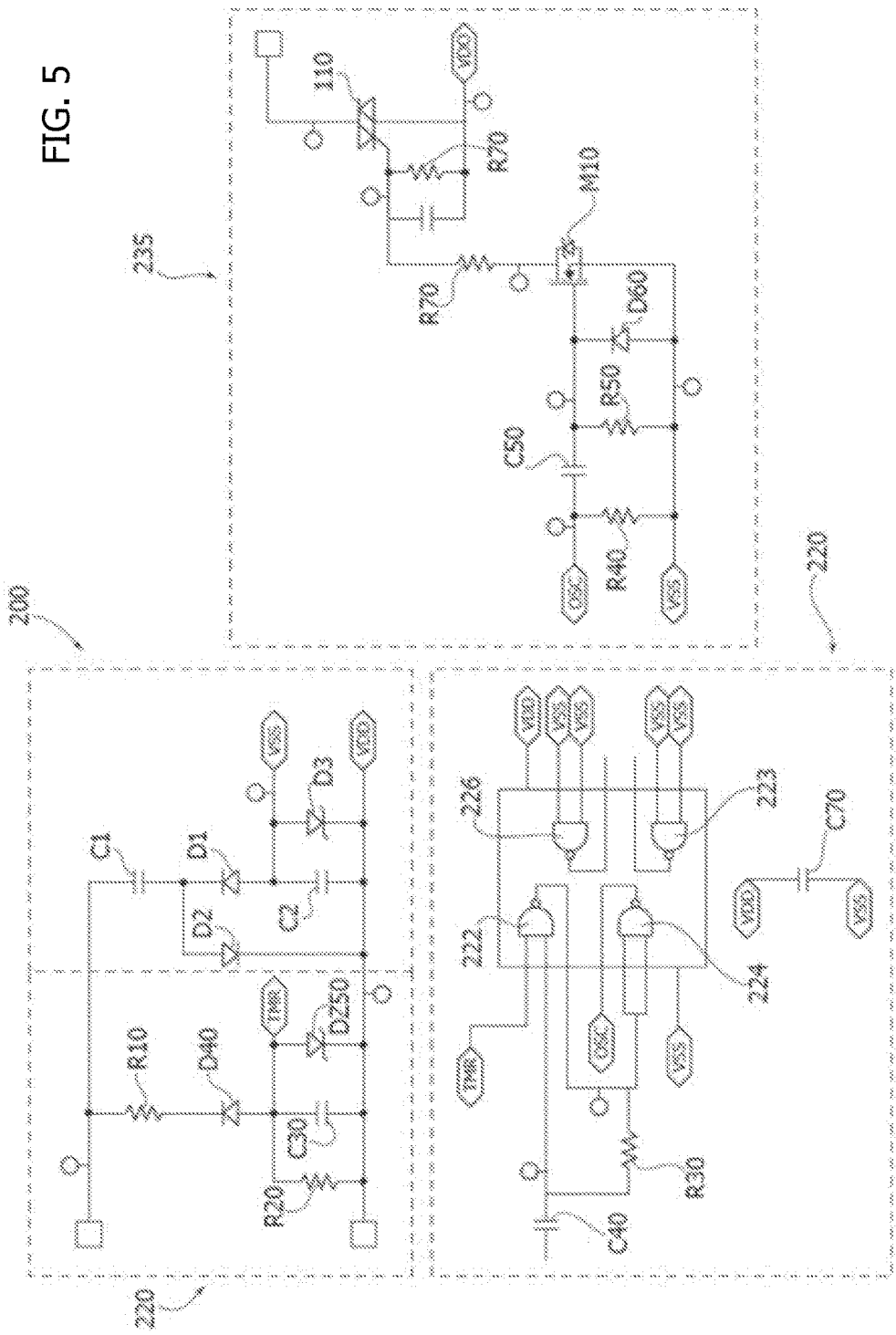

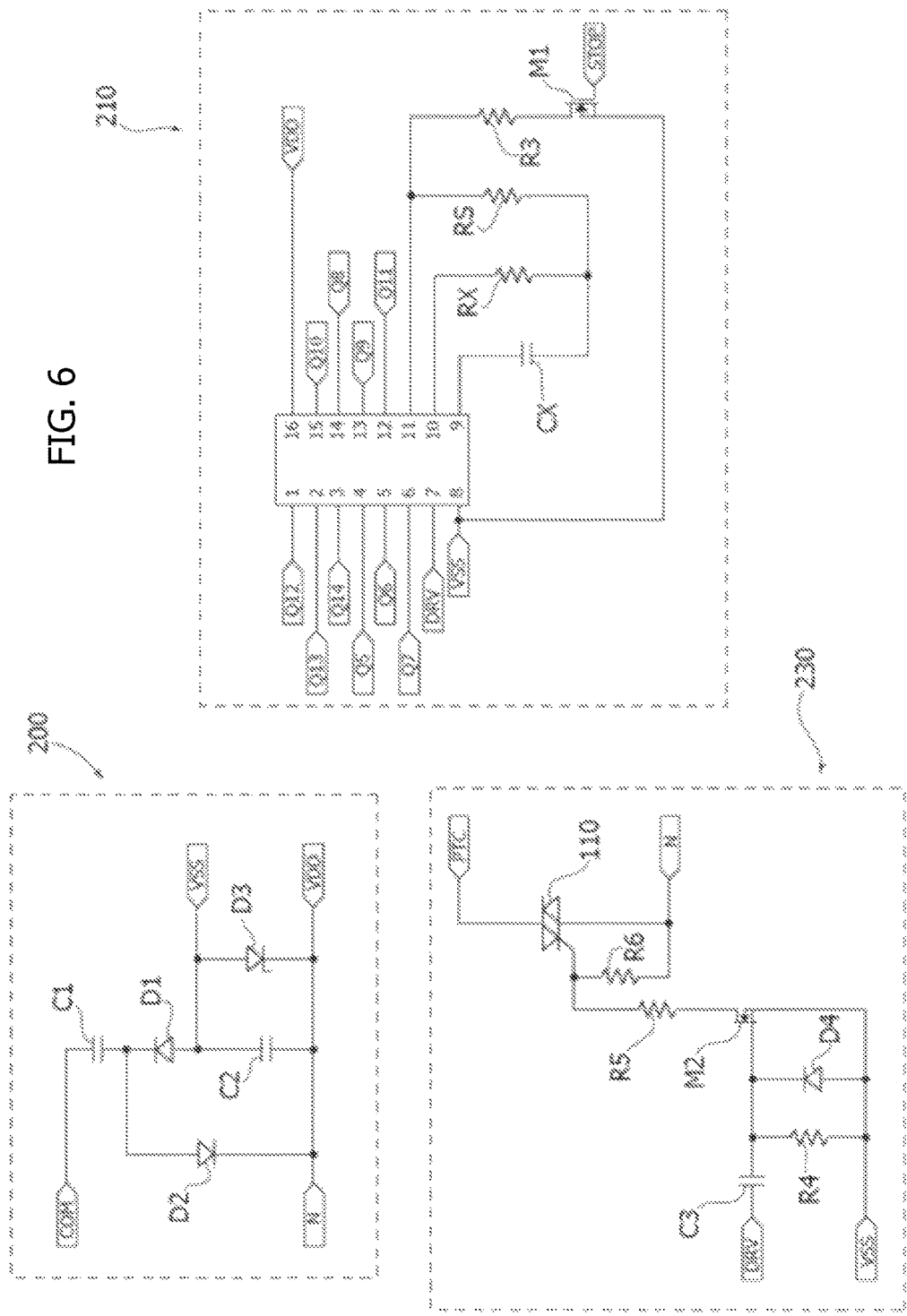

COMMERCIAL COMPRESSOR WITH ELECTRONIC START DEVICE FOR THE START OF THE ELECTRIC MOTOR

TECHNICAL FIELD

This invention relates to a commercial compressor provided with an electronic start device for starting the electric motor.

In particular this invention relates to compressors for refrigeration in applications of the commercial type (that is refrigerated display cabinets in shops and/or supermarkets, devices for refrigerating draught beverages, cold stores, etc.).

Refrigerators of the commercial type normally have two windings: a run winding which supplies the motor during normal operation and a start winding which is supplied for a short period of time (approximately 1-2 seconds) only when the motor is started, to provide an initial peak torque to start the motor's rotor in angular movement. The latter winding is disconnected immediately after the motor starts.

The purpose of electronic start devices is to supply the start winding for a period of time when the motor has to be switched on, and to switch off/disconnect the start winding when the motor has started.

In addition to this, for some commercial compressor applications there is a need to increase the peak torque to overcome difficult starting conditions, such as for example imbalanced pressures in the circuit. For this purpose electronic start devices have to be equipped with a capacitor of sufficiently high capacitance placed in series with the start winding (also referred to as a start capacity or Cstart).

Also, when high efficiency during operation is required it is possible to provide for a second permanently connected capacitor, the run capacitor or Crun.

Thus commercial refrigerators may comprise:
a start capacitor (Cstart), which is only used during the starting stage to obtain a higher starting torque, and
a run capacitor (Crun), which is permanently connected to improve the motor's efficiency.

Various types of compressors with different electronic start devices are therefore commercially available; some may only have the start capacitor, others only the run capacitor, while others may have both, depending upon the applications for which they have been designed.

Technological Basis

As already mentioned, the single phase asynchronous motors used in refrigerator compressors have two windings—the run winding, that which causes the motor to operate during normal operation, or steady state conditions.

This run winding is not however capable of starting the motor from a stationary state, and for this a second winding is needed, known as the start winding. The start winding is purely designed to provide the initial peak torque to start the motor's rotor in angular movement, and can be disconnected immediately after the motor has started. This start winding therefore only acts during an initial transitory period.

The starting devices applied to compressors for refrigerators therefore have the function of switching on the start winding when the motor starts and switching it off after a suitable starting period, which is typically of the order of a few seconds.

The more conventional models of starting devices (see FIG. 1), which are still widely used, comprise an electromechanical relay or amperometric relay, or alternatively a voltametric relay.

The relay starting device illustrated in FIG. 1 uses an electromechanical relay 10 which switches on the start winding 20 and is excited by the current in the run winding 30. When starting, the latter is high and closes relay 10, which then also supplies start winding 20; when the motor has started the current in run winding 30 falls sharply, relay 10 opens and disconnects start winding 20 from the remainder of the circuit.

In addition to this, in the relay starting device it is also possible to provide a run condenser 40, with a bridge connection between the two output terminals of start winding 20 and run winding 30 to disconnect them, and a motor protection element 50 placed on supply line L.

This type of starting device is widely used in compressors for commercial applications (for example for refrigerated display cabinets in bars and shops, cold stores, etc.).

As already mentioned, commercial compressors, which have greater power than domestic compressors, also use a start capacitor 45 (Cstart) which is fitted and connected in series to start winding 20. Also, even though they are not necessary, run condensers Crun 40 are increasingly widely used in all types of compressors.

Thus the electronic start device must ensure operation when both capacitors 40 and 45 are present, regardless of the value of their capacitance.

The conventional solution for starting compressor motors uses the abovementioned electromechanical relay 10, as illustrated in FIG. 1, which activates the start winding and is excited by the current in the run winding. When starting the latter is high and closes the relay, which then also supplies the start winding. When the motor has started the current in the run winding falls sharply, the relay opens and disconnects the start winding from the remainder of the circuit.

This solution does however have some disadvantages:
each electric motor must have its own model of relay;
the start capacitor, if present, causes discharges of current which damage the relay; it is not therefore possible to use this start device when the run capacitor is also present;
the start relay must be mounted in a vertical position, thus placing a constraint on the design of the terminal board;
in a situation where the rotor is jammed and the motor cannot start, the start winding remains permanently connected, causing rapid overheating of the motor.

Nevertheless the start winding has one desirable characteristic—the time for which the start winding is connected is extended when the supply voltage falls, that is specifically when the motor requires more time to start.

SCOPE AND SUMMARY

The object of this invention is to provide a compressor of the commercial type with an electronic start device for starting the electric motor which overcomes the disadvantages of known devices.

The invention has been developed in particular with a view to application to commercial refrigerators.

In particular this invention has the object of providing a compressor with an electronic start device for starting the electric motor for use in equipment such as for example refrigerators of the commercial type, through which the time for which the start winding is connected tON can be controlled through control by a solid state switch.

In accordance with this invention this object is accomplished through a compressor having an electronic start device having the characteristics constituting the subject matter of claim 1.

The claims form an integral part of the teaching provided in relation to the invention.

In various embodiments compressors for commercial refrigerators comprise an electric motor comprising a start winding and a run winding, in which the input terminals to the start winding and the run winding are connected together and to the supply voltage. In addition to this there is an electronic start device to supply the start winding during a starting period.

The electronic start device comprises a run capacitor having a first terminal connected to the output terminal of the start winding and a second terminal connected to an output terminal of the run winding, and a start capacitor having a first terminal connected to the output terminal of the start winding.

The electronic start device also comprises a solid state switch that supplies the start winding, in which the solid state switch is connected between the second terminal of the start capacitor and the neutral terminal of the supply.

Switching of the solid state switch is controlled by a control circuit comprising a delay circuit that closes the switch when the motor is switched on and opens it after said starting period once the motor has been started.

Preferably the solid state switch is a triac.

In various preferred embodiments the electronic start device comprises a damping inductance in series with the start capacitor to block current discharges generated by the run capacitor. Preferably this damping inductance may be integrated directly into the electronic board, or the PCB (Printed Circuit Board).

BRIEF DESCRIPTION OF THE DRAWINGS

This invention will now be described in detail with reference to the appended drawings provided purely by way of non-limiting example, in which:

FIG. 5 shows in detail one circuit implementation of some blocks in FIG. 4B, FIG. 6 shows in detail one circuit implementation of some blocks in FIG. 4A.

DETAILED DESCRIPTION

Figure 2:
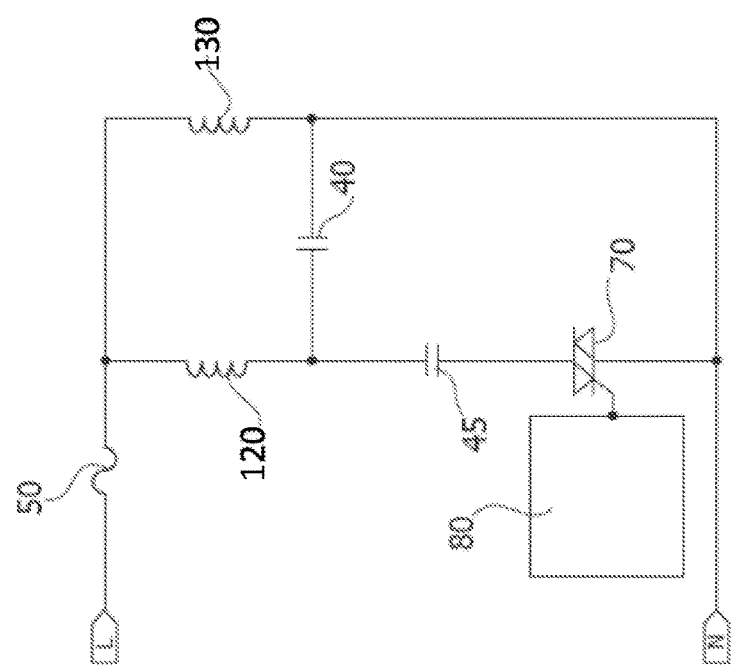
FIG. 2 illustrates one embodiment according to this invention.
Figure 1:
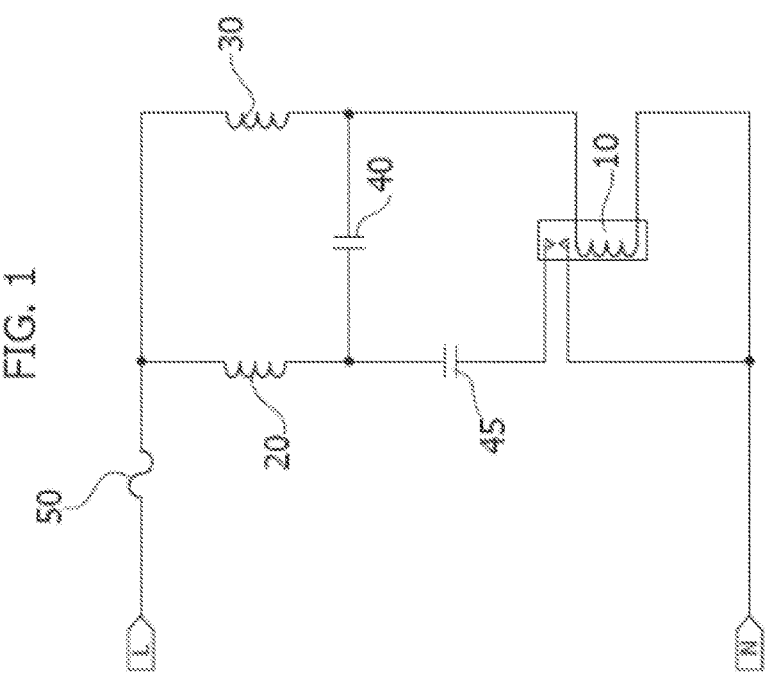
FIG. 1, relating to the known art, has already been described.

The following description illustrates one or more specific details with a view to providing a thorough understanding of various example embodiments. The embodiments may be obtained without one or more of such specific details, or through other processes, components, materials, etc.

In other cases known structures, materials or operations are not illustrated or described in detail to avoid obscuring some aspects of the embodiments.

In the context of this invention reference to an "embodiment" is intended to indicate that a particular configuration, structure or characteristic described in relation to the embodiment is included in at least one embodiment. Thus expressions such as "in an embodiment" which may be present in one or more paragraphs of this description will not necessarily refer to the same embodiment. Furthermore, particular configurations, structures or characteristics may be combined in any suitable way in one or more embodiments.

The references used here are merely provided for convenience and therefore do not define the scope of protection or the extent of embodiments.

This invention relates to a commercial compressor provided with an electronic start device for starting the electric motor. The electronic start device is capable of connecting the start winding to the remainder of the circuit and disconnecting it as soon as the motor has been fully started.

The proprietor has developed a commercial compressor provided with an electronic start device (also known as an "electronic starter") which is capable of overcoming the disadvantages in known electronic start devices based on the use of relays.

With particular reference to FIG. 6, reference 200 indicates a compressor unit. The electronic start device is located in an enclosure having a body 230 provided with a removable cover 210 for connection to compressor unit 200 by means of a bracket. The electronic start device is mounted on an electronic board 220 on which are mounted a start capacitor 45, a run capacitor 40, a damping coil 65 and a motor protector 50.

The general structure of the electronic start device is illustrated in FIG. 2.

With reference to FIG. 2, start winding 120 is supplied via a solid state switch 70, typically a triac; this latter switch 70 is controlled by a delay circuit 80 which controls its switching. In particular it controls closure of triac 70 when the motor is supplied and causes it to reopen after a suitable period of time for starting.

This time for which the start winding is on is known as the ON time (tON) and is typically operational for about one second.

The main differences between the electronic start devices lie in the control circuit which connects and disconnects the start winding, and in the mechanism through which the ON time tON for the start winding is generated.

Some electronic starters use the charge of a capacitor C through a resistance R. The time constant R×C provides the time base from which the desired ON time tON can be obtained by various methods.

In particular different embodiments of the electronic starter device which can be used in the compressor according to this invention will be described below.

Figure 3A:
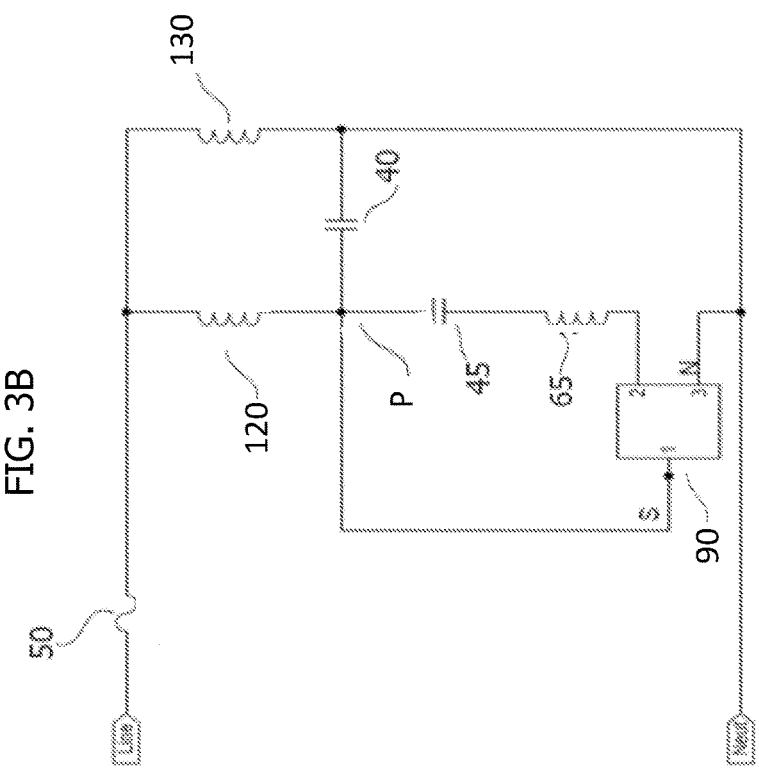
FIGS. 3A and 3B are architectures of two embodiments of an electronic start device according to this invention.
Figure 3B:
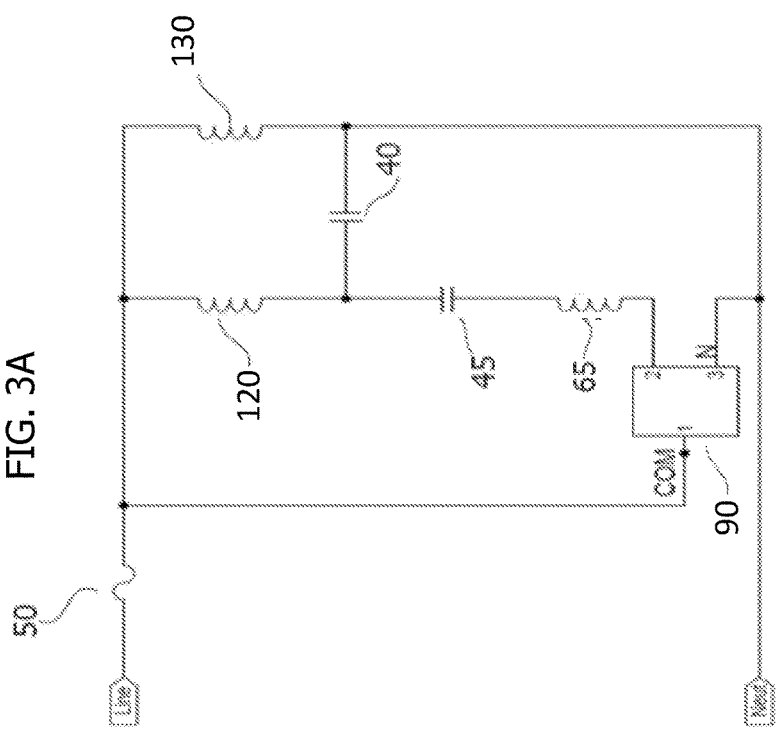

With particular reference to FIGS. 3A and 3B the general scheme of an electronic start device will now be described, using two alternative embodiments. Again with reference to FIG. 2, start winding 120 is supplied via a solid state switch 70, typically a triac 110; the latter is controlled by a delay circuit 80 which closes it when the motor is supplied and opens it again after a suitable time for start-up. As already indicated, this time is called the ON time (tON).

In FIG. 3 the electronic start device (which comprises solid state switch 70 and delay circuit 80) is indicated by the reference number 90.

In one or more embodiments the ON time depends on the supply or line voltage and increases as that decreases, in such a way as to provide the motor with more time to start when the line voltage is low.

In one or more embodiments the ON time is instead fixed and preset; the dependent link between the ON time tON and the supply voltage allows for a simpler connection between the electronic start device and the motor, which as a further advantage makes it possible for very compact terminal boards to be constructed. The advantages of this solution are associated with reduced size, reduced number of parts and components used and simplification of the assembly stage. These advantages also have economic consequences, with a saving on components.

In particular this invention relates to a compressor for commercial refrigerators comprising an electric motor and an electronic start device 90 for starting the electric motor which comprises a triac 110 and a control circuit 100 (see FIG. 4).

In particular the compressor according to the invention comprises an electric motor provided with a start winding 120 and a run winding 130. Electronic start device 90 is provided with a solid state switch 70 which supplies start winding 120. In various embodiments this solid state switch 70 is in particular a triac 110.

In various embodiments of electronic start device 90 described here there are various control circuits which control the switching of triac 110 using different mechanisms for generating the ON time, or the activation time for start winding 120.

Figure 4B:
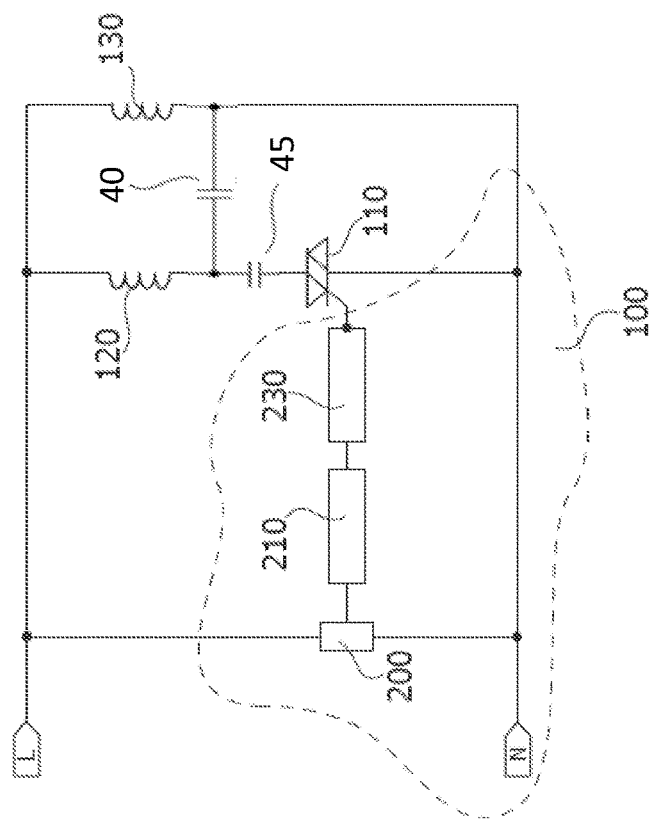
FIGS. 4A and 4B show in detail the embodiment of some blocks in FIGS. 3B and 3A.
Figure 4A:
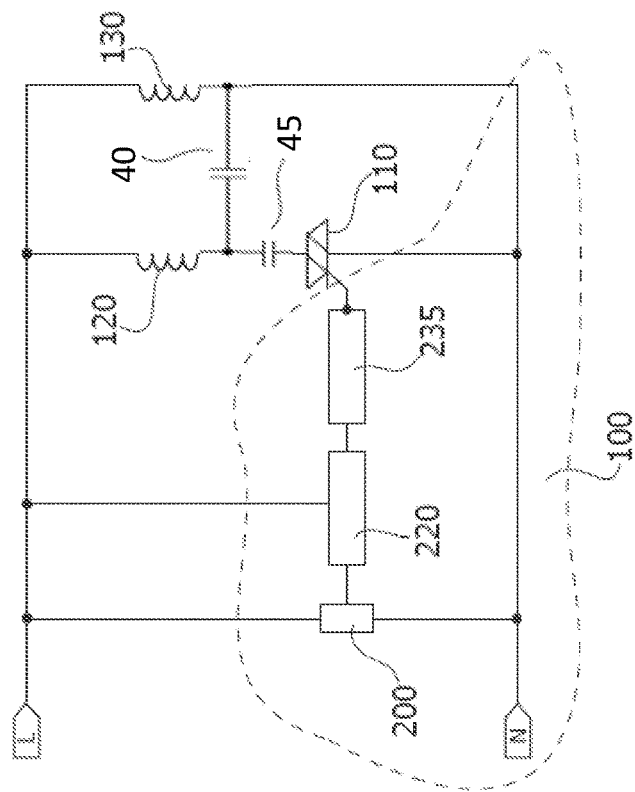
Figure 7:
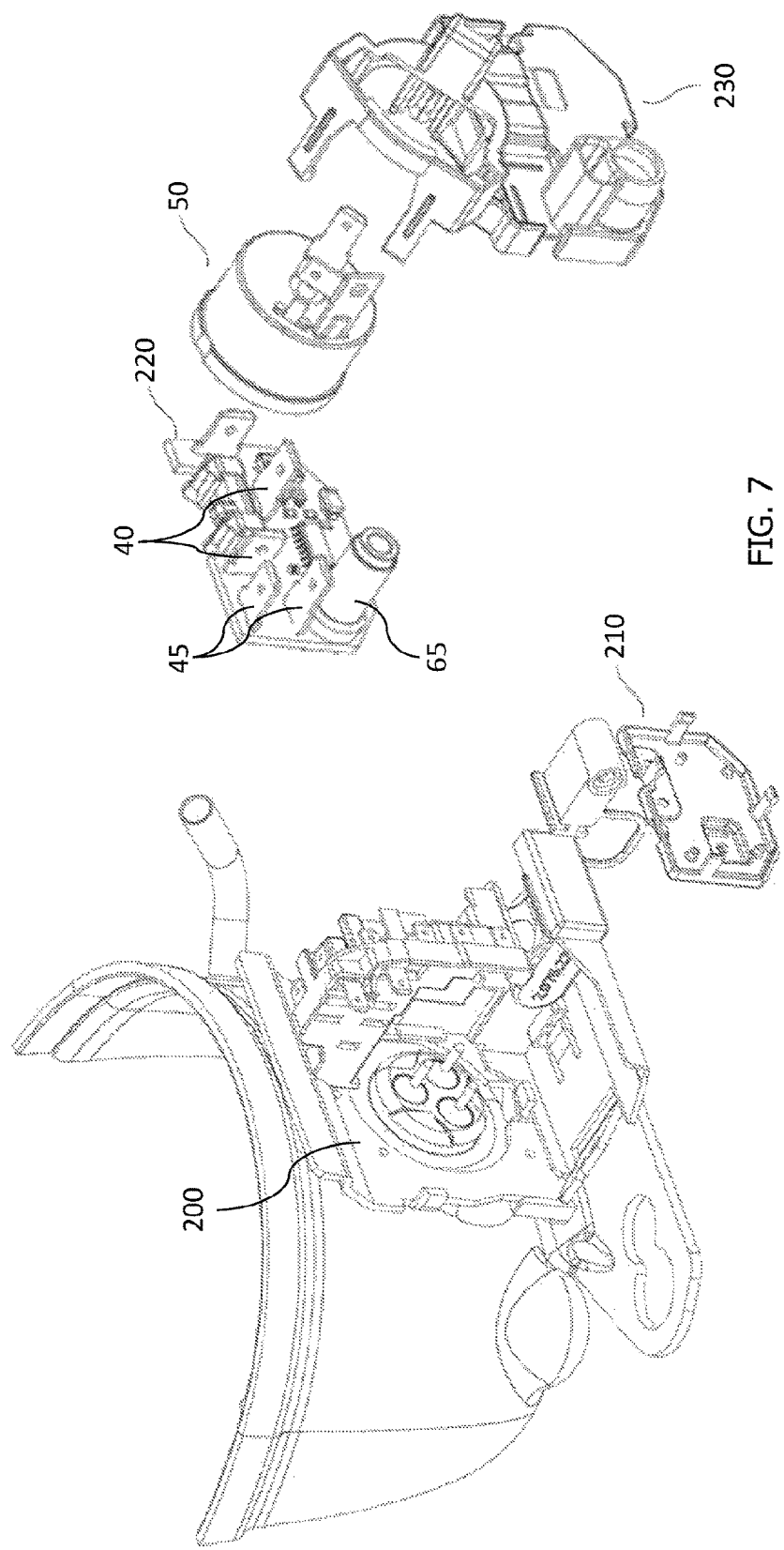
FIG. 7 shows an exploded view of the compressor unit according to one embodiment.

With reference to FIGS. 4A and 4B, the following blocks are common to various embodiments:
a triac 110, which as mentioned acts as a solid state switch used to connect and disconnect start winding 120 to and from the remainder of the circuit,
a power supply 200 which generates the supply voltage required for the components of electronic start device 90; this supply is identical in all the embodiments except as regards whether or not it is connected to the supply voltage;
a "Gate driver" circuit 230, 235 which controls the gate terminal of triac 110 with the appropriate voltages and currents;
a timer circuit 210, 220 ("Timer"), which controls the switching of triac 110 from its closed condition to its open condition.

In particular, with reference to FIGS. 4A and 4B electronic device 90 comprises a control circuit 100 comprising:
a power supply 200, which receives as an input an alternating supply voltage L and generates a rectified voltage as an output,
a delay circuit 210, 220, supplied by the rectified output voltage to power supply 200, and capable of generating an activating signal, and
a triggering circuit 230, 235 which can be activated by means of the abovementioned activating signal.

Control circuit 100 controls the switching of triac switch 110, which is located between the power terminal of start winding 120 and the output from triggering circuit 230, 235.

One of the most significant characteristics in this solution is that the electronic start device can control switching of the switch by imposing and/or selecting a time for the ON time tON for the start winding. In particular the ON time tON can depend on the supply voltage and increase as the supply voltage decreases. Otherwise in other embodiments the ON time is fixed and preset.

In one or more embodiments delay circuit 210 comprises an RC circuit which charges a capacitor C from the supply voltage through a resistance R. The ON time comprises the time required for the voltage at the terminals of capacitor C to reach a preset level. This time will depend on the value of resistance R, the value of capacitor C and the value of the supply voltage present on line L. Variability in the ON time is therefore obtained in relation to the supply voltage, which is a very useful property for ensuring that the motor will start even if low voltages are present. With reference to FIG. 3A, an input of electronic start device 90 is connected to the supply voltage present on line L through a line COM.

In one or more embodiments delay circuit 220 is instead digital; an integrated circuit generates an oscillation at a fixed and relatively high frequency. This integrated circuit contains within it a set of cascade dividers which progressively divide the frequency of the oscillator by two. Increasingly lower frequencies are thus obtained and their oscillation periods constitute a set of increasing potential ON times. Through this embodiment designers can choose the divider output offering the ON time required for a particular application on the basis of starting needs.

With reference to FIG. 3B one input of electronic start device 90 is connected through a line S to a node P located between the output terminal of start winding 120 and the first terminal of start capacitor 45 Cstart.

Some possible circuit implementations of the blocks present in the various embodiments of the electronic start device are illustrated in FIGS. 5 and 6.

In particular, in various embodiments the electronic start device comprises a control circuit 100 which is capable of generating an ON time tON for start winding 120 which can be selected from the parameters of said delay circuit.

The electronic start device described here may provide for different delay circuits with a different mechanism of generating ON time tON.

The individual blocks will be described in detail in the rest of this description below.

With reference to FIG. 5, power supply circuit 200 comprises a conventional capacitive divider—the supply voltage is taken from the common terminal COM of the compressor and the neutral terminal N of the supply. The supply voltage is rectified by means of diodes D1 and D2 and partitioned by capacitors C1 and C2. Capacitor C2 is charged directly from the voltage line through the voltage drop in capacitor C1. At the terminals of capacitor C2 there is a Zener diode D3 which has the function of stabilising the supply voltage for the circuit, that is delivered from terminals VSS and VDD.

Delay circuit 220 comprises an integrated CMOS (Complementary Metal-Oxide-Semiconductor) of the 4000 series, preferably 4093. This contains four NAND gates: the first gate 222 (ABJ) is used as an oscillator and the second gate 224 (CDK) is used as a buffer to take up the oscillation and generate an activation signal OSC which controls triggering circuit 235.

In various embodiments the other two gates 226 and 228 present in the integrated CMOS 4093 are not used.

In various embodiments the other two gates 226 and 228 in integrated CMOS 4093 may be used as a buffer for the delay voltage.

The first NAND gate 222 has an enabling input connected to the delay system comprising resistances R10-R20 and capacitor C30.

Its operation is as follows: when the motor is switched on the oscillator provided by NAND gate 222 (ABJ) begins to oscillate at a frequency of some kHz; its output enters the buffer comprising second NAND gate 224 (CDK) which has the purpose of not charging the oscillator. Output OSC from this gate 224 is passed to the control circuit for gate 235 which produces a train of negative pulses to triac gate 110, keeping it on (that is in its closed position) for all the ON time tON.

At the same time delay capacitor C30 begins to charge up from the supply voltage through resistance R10. When the voltage at the terminals of C30 reaches a predetermined threshold voltage NAND gate 222 is disabled, the oscillation ceases, triac gate 110 receives no further supply and triac 110 switches off (or is changed into its closed condition). The time required to achieve this threshold level is equal to the ON time tON, and is adjusted by suitably selecting the values of resistances R10-R20 and capacitor C30. It is important to note that, for the same values of R10-R20-C30 the time required to reach the threshold voltage which switches off the oscillations is longer the lower the supply voltage. Thus ON time tON increases as the supply voltage decreases.

This characteristic is very useful for assisting starting of the motor when supply voltages are low.

The control circuit for gate 235 is designed to excite the gate of triac 110, in order to keep it on throughout the ON time. Because of its nature triac 110 switches off at every half-wave when the current at its terminals passes through zero, and is then switched on again for every half-wave throughout the duration of the ON time. For simplicity of the circuitry it is simpler to excite it continuously for all the ON time without any synchronisation with the current half-waves. If it is off it is switched on again; if it is already on the gate signal is simply ignored.

Switching on triac 110 requires a current of a few milliamperes in the gate; constantly providing this current throughout the ON time tON would, as already mentioned, require uneconomical dimensioning of capacitors C1 and C2 in supply system 200. Triac 110 is therefore excited with a sequence of pulses of 10-15 mA each, which are very short, so that they correspond to a very much lower average current. These pulses are generated by the triggering block for gate 235: this takes the same high frequency oscillation generated by the integrated CD4093, and further constrains its pulses through the derivative circuit comprising condenser C3 and resistance 4 and uses them to switch on MOSFET M2 with pulses.

When switched on the latter connects the gate of triac 110 to negative voltage VSS, therefore injecting a negative current pulse. As already mentioned previously, triac 110 can be controlled to be switched on by injecting positive or negative pulses into its gate, but in the latter case (preselected here) the required current is less and all types of triac 110 are guaranteed to be switched on.

FIG. 6 illustrates a different circuit implementation of some blocks of the electronic start device.

Power supply 200 is wholly similar to that in FIG. 5, with the only difference that the terminal which was formerly connected to common terminal COM of the compressor (FIG. 3A) is now connected to the start terminal (FIG. 3B), or to the output terminal of the start circuit. This is a very important difference, because it allows for particularly simple connection to the motor. It also makes it possible to incorporate the electronic start device with the start capacitor, thus obtaining a single component.

The advantage of this embodiment lies in simplified wiring and therefore simplified assembly in the production line. A reduction in costs and an increase in reliability is thus obtained.

Delay circuit 210 in the embodiment illustrated in FIG. 6 comprises an integrated CMOS (Complementary Metal-Oxide-Semiconductor) of the 4000 series, and in particular the integrated 4060. This contains an oscillator (not illustrated) within it, the oscillation frequency of which fosc can be set through the outer network comprising CX-RX-RS, and a series of digital devices which divide this frequency fosc by numbers from 16 to 16384 and therefore provide increasingly longer oscillation periods.

Output Q4 from delay circuit 210 (corresponding to terminal 7) is selected and sends the oscillation to the trigger block for gate 230, which uses it to switch on triac 110 (or place it in its closed condition) and thus supply start winding 120.

The sequence of pulses triggering the gate for triac switch 110 is generated by circuit 230.

Triggering circuit 230 receives a signal on a DRV line as an input, which is the output from delay circuit 210.

Gate triggering circuit 230 is intended to excite the gate for triac 110, thus keeping it on (or in its closed condition) throughout the ON time tON. Because of its nature triac 110 will switch off at every half-wave when the current at its terminals passes through zero and will then be switched on again for each half-wave throughout the duration of ON time tON. For simplicity of circuitry it is simpler to excite it continuously throughout the ON time tON without any synchronisation with the current half-wave. If it is switched off it will switch on again; if it is already on the signal at the gate of triac 110 will be simply ignored.

Delay circuit 210 operates in the following mode: a MOSFET M1, the gate of which (STOP terminal) is connected to the output of one of the dividers (indicated by Q5÷Q14), is added to the outer delay network comprising CX-RX-RS. Let us assume for example that there is an output Q13 which corresponds to division by 8192. After a certain period of time (equal in seconds to 8192/fosc) output Q13 will change to the high status and then MOSFET M1 will switch on. By acting in this way delay system CX-RX-RS will be short-circuited by resistance R3, the oscillation will cease and the circuit will remain "frozen" in that state. As there is no oscillation the gate for triac 110 will no longer be excited and triac 110 will switch off (or will be changed into its open condition). The ON time tON therefore corresponds (in this example) to 8192/fosc and is very accurate and independent of other circuit parameters and/or the motor.

The triggering circuit for gate 235 (gate driver) is wholly similar to that described above.

The pulses leaving delay circuit 220 are present on the OSC line and are supplied to a derivative network C50-R50 to obtain shorter pulses with a reduced duty cycle (approximately 50%). The derivative network produces positive and negative pulses; the latter are undesired and are cut out by diode D60.

The positive pulses trigger the MOSFET M10 gate which periodically connects the gate of triac 110 to the negative supply voltage through resistance R60. MOSFET M10 and resistance R60 act together as a current generator which injects negative current pulses into the gate of triac 110.

For reasons of reliability, when run condenser Crun 40 is present it is also necessary to insert a small damping inductance Ldamp 65 (damping coil) in series with start capacitor Cstart 45, as illustrated in FIGS. 3A and 3B. Preferably this damping inductance 65 can be integrated directly into the electronic board, or the PCB (Printed Circuit Board).

Run condenser Crun 40 in fact causes current to be discharged through the electronic start device, which without this inductance would reach levels that were too high for triac 110.

Thus the electronic start device, in both versions and when equipped with the damping inductance Ldamp 65 (which becomes an integral part of the electronic start device), satisfies all the requirements for use with commercial compressors.

In the case of delay circuit 220 the duration of the activation signal also depends on the line voltage.

In the case of delay circuit 210 the ON time does not instead depend on the supply voltage, but only on the values of components CX, RX and RS. In this case therefore the length of time tON remains very stable if the line voltage, type of motor and temperature change.

With its switching between states triac switch 110 controls the switching on and switching off of start winding 120. Triac switch 110 is switched on (or placed in its closed condition) by applying a sequence of negative pulses to its gate terminal. The sequence is generated by the oscillator circuit (present in the delay circuit) and continues for all the ON time tON. When the sequence of pulses ceases triac switch 110 is switched off (or is changed to its open condition) and start winding 120 is disconnected from the remainder of the circuit.

A sequence of short pulses is chosen instead of a continuous supply signal for the gate as this requires a smaller current from the supply system. In fact a sequence of current pulses having a peak of 10 mA and a duty cycle of 10% corresponds to an average current of 1 mA. This choice is not only based on the need to save energy but is also dictated by the need to use smaller (and cheaper) capacitors in the supply system.

In addition to this, a sequence of negative pulses is selected because negative triggering of the gate in triac switches corresponds to operating in quadrants II and III, which are available for all types of triac and require a smaller gate current.

In the embodiment illustrated in FIG. 6 delay or timer circuit 210 is a digital timer; an integrated circuit generates an oscillation at a fixed and relatively high frequency. This integrated component also includes a battery of cascade dividers which progressively divide the frequency of the oscillator by two. Thus increasingly lower frequencies whose periods of oscillation constitute a set of increasing potential tON times are obtained as an output from the integrated circuit. On the basis of starting needs designers will choose the output from the divider that offers the desired ON time tON. This ON time tON is fixed and does not depend on the supply voltage.

In the embodiment illustrated in FIG. 5 delay (timer) circuit 220 comprises an RC system which charges a capacitor C through the supply voltage via a resistance R. The ON time tON comprises the time required for the voltage at the terminals of the capacitor to reach a predetermined level. This time depends on resistance R, capacitor C and the applied supply voltage.

In this embodiment illustrated in FIG. 5 the ON time tON varies as a function of the supply voltage, and this is very useful for ensuring that the motor will also start if voltages are low.

Thus the compressor according to this invention is provided with an electronic start device capable of operating when a start capacitor having any value is present. The electronic device is universal and does not require different calibration for different motors.

In various embodiments the ON time is accurately controlled by a digital circuit and an internal oscillator and does not depend on external factors such as temperature, the electric motor currents, the values of the capacitors present, and so on.

In some embodiments the ON time increases as the line voltage decreases, counterbalancing the fall in the starting torque.

In various embodiments the electronic start device can be mounted in any position, offering greater flexibility and various possibilities for connection to the motor.

In an alternative embodiment the ON time is fixed and independent of the line voltage.

The advantage of using a solid state switch such as a triac is mainly associated with the consumption required by the relay winding; in fact the triac has a very much smaller consumption, in addition to being manifestly of smaller size. Also the switching times for the triac are very much more repeatable than those generated by the relay.

Of course the details of embodiments and forms of implementation may vary, even significantly, with respect to what is illustrated here purely by way of a non-limiting example without thereby going beyond the scope of protection. This scope of protection is defined by the appended claims.

The invention claimed is:

1. A compressor for commercial refrigerators comprising:
an electric motor, comprising a start winding (120) and a run winding (130), wherein the input terminals of said start winding (120) and of said run winding (130) are connected to each other and to the voltage line (L),
an electronic start device, for powering said start winding (120) for a start period,
wherein said electronic start device includes:
a run capacitor (40) having a first terminal connected to the output terminal of said start winding (120) and a second terminal connected to the output terminal of said run winding (130), and
a start capacitor (45) having a first terminal connected to the output terminal of said start winding (120) and,
characterized in that said electronic start device includes:
a solid state switch (110) that powers the start winding (120), and connected between the second terminal of the start capacitor (45) and the neutral terminal of the network (N), and
a control circuit (100) comprising a timing circuit (210, 220) which controls the switching of said solid state switch (110) by closing it when the motor is switched on and by opening it at the end of said start period when the motor has started.

2. The compressor according to claim 1, characterized in that said solid state switch (110) is a triac.

3. The compressor according to claim 2, characterized in that said control circuit (100) comprises a power supply network (200), which receives as input an AC voltage line and generates as output a rectified voltage.

4. The compressor according to claim 3, characterized in that said timing circuit (210,220) is powered by said rectified voltage output by said power supply network (200), and is capable of generating an activation signal (DRV,OSC).

5. The compressor according to claim 4, characterized in that said control circuit (100) further comprises a triggering circuit (230,235), activated by said activation signal (DRV, OSC), wherein said triggering circuit (230,235) controls the switching of said solid state switch (110).

6. The compressor according to claim 5, characterized in that said triggering circuit (230, 235) of the Gate of the triac switch (110) receives said activation signal (DRV,OSC) and powers it to a derivative network (C3, R4, C50, R50) so as to obtain shorter pulses with a reduced duty cycle, and wherein the negative pulses output from the derivative network (C3, R4, C50, R50) are cut by a diode (D4, D60).

7. The compressor according to claim 4, characterized in that said timing circuit (210) comprises an oscillator, whose oscillation frequency (fosc) is set via an external RC network (CX, RX, RS), and a series of digital dividers which divide said frequency (fosc) to provide increasingly long periods of oscillation, to generate an activation signal (DRV) which controls the triggering circuit (230), wherein said activation signal (DRV) is independent of the voltage line.

8. The compressor according to claim 7, characterized in that said timing circuit (210) is made with an integrated 4000 series CMOS, and in particular the integrated 4060 that comprises at its inside said oscillator and said series of dividers.

9. The compressor according to claim 4, characterized in that said timing circuit (220) is made with a CMOS integrated 4000 series, and in particular the integrated 4093, in which the first NAND gate (222) is used as an oscillator, and the second NAND gate (224) is used as a buffer to collect the oscillation and generate an activation signal (OSC) which controls the triggering circuit (235), wherein said activation signal (OSC) is dependent on the line voltage.

10. The compressor according to claim 9, characterized in that said first NAND gate (222) has an enable input connected to a timing network (R10, R20, C30), whose values define the duration of the activation signal (OSC) together with the value of the voltage line.

11. The compressor according to claim 3, characterized in that said power supply network (200) is made with a capacitive divider (C1, C2) which takes the voltage from the voltage line and rectifies it by means of a pair of diodes (D1, D2) to output said rectified voltage, and in that said power supply network (200) further comprises a Zener diode (D3) to stabilize the rectified supply voltage (VDD, VSS) provided at the output of the power supply network (200) itself.

12. The compressor according to claim 1, characterized in that said electronic start device comprises a damping inductance (65) in series with said start capacitor (45) to block the discharge current generated by said run capacitor (40).

* * * * *